W. J. FERNIE.
PROCESS OF RETTING FLAX.
APPLICATION FILED JUNE 16, 1913.

1,083,074.

Patented Dec. 30, 1913.
2 SHEETS—SHEET 1.

WITNESSES

INVENTOR
William James Fernie
BY
Byrnes Townsend & Brickenstein
ATTORNEYS

W. J. FERNIE.
PROCESS OF RETTING FLAX.
APPLICATION FILED JUNE 16, 1913.

1,083,074.

Patented Dec. 30, 1913.
2 SHEETS—SHEET 2.

WITNESSES
R. J. Hulsizer.
C. H. Potter.

INVENTOR
William James Fernie
BY
Byrnes Townsend & Brickenstein
ATTORNEYS the
UNITED STATES PATENT OFFICE.

WILLIAM JAMES FERNIE, OF DROMARA, IRELAND.

PROCESS OF RETTING FLAX.

1,083,074.
Specification of Letters Patent. Patented Dec. 30, 1913.
Application filed June 16, 1913. Serial No. 774,004.

*To all whom it may concern:*

Be it known that I, WILLIAM JAMES FERNIE, a subject of the King of Great Britain and Ireland, and residing at Dromara, in the county Down, Ireland, have invented certain new and useful Improvements in the Process of Retting Flax, of which the following is a specification.

This invention relates to the retting of flax and like straws by a fermentation process.

The object of the present invention is to provide a fermentation process of retting which is simple and convenient to work, capable of producing a uniform product and of high grade can be operated at all times of the year, and avoids moving the straw from one tank to another during the retting process.

The invention enables retting to be controlled either to obtain when dealing with the lower classes of straw a reduction of the time of retting, or when dealing with the higher classes of straw, a better color and strength of fiber with a reduced number of operations.

The invention consists in effecting the retting in a slow and uniform flow of water (preferably warmed) supplied at the top of the vertically disposed straw, and withdrawn steadily and uniformly below the straw whereby the retting products are removed by downward displacement.

This invention further consists in the improvements in and relating to the retting of flax and like straws hereinafter indicated.

Figure 1:
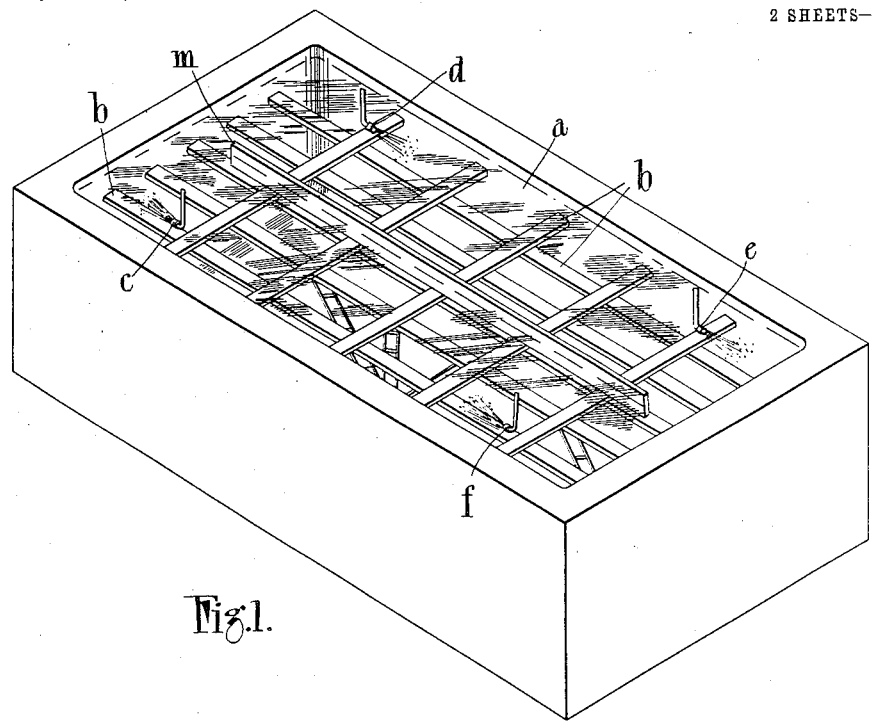
Figure 3:
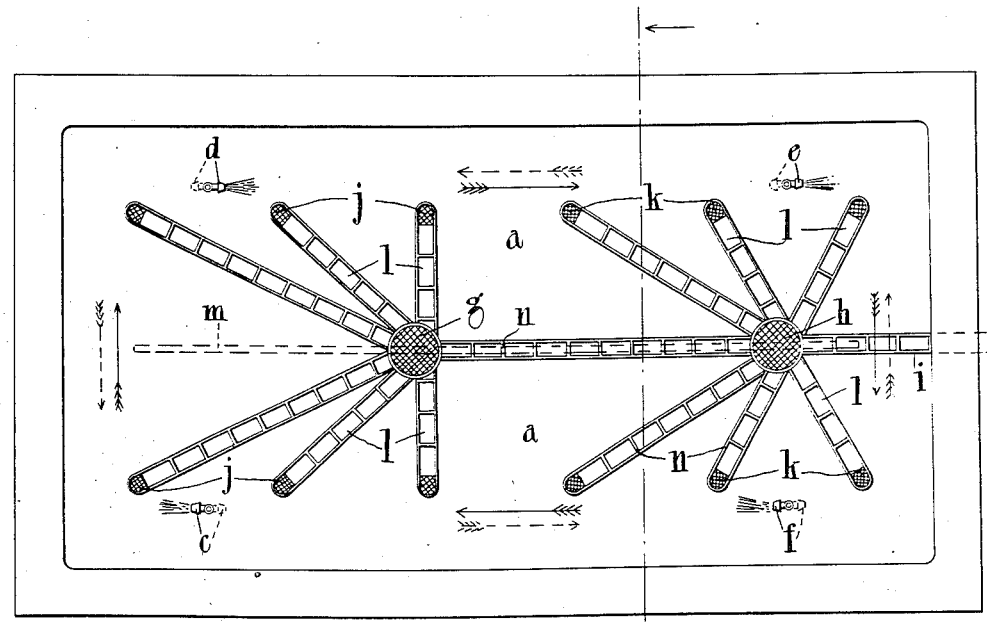
Figure 2:
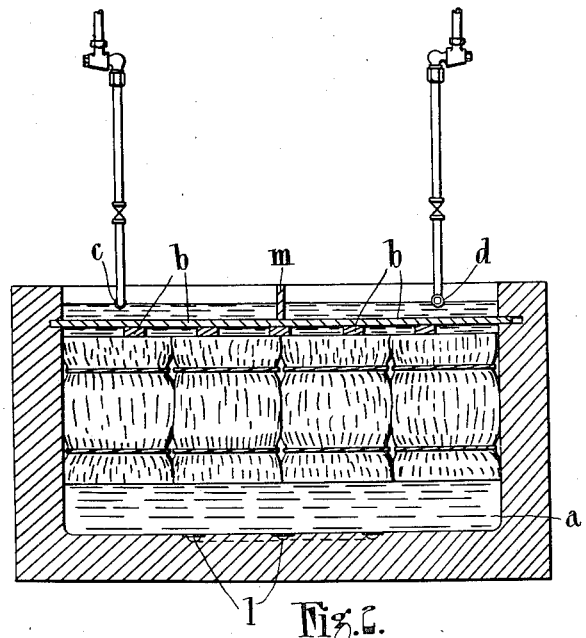
Figure 4:
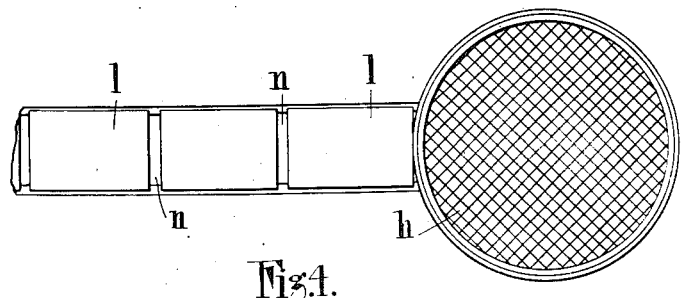
Figure 5:
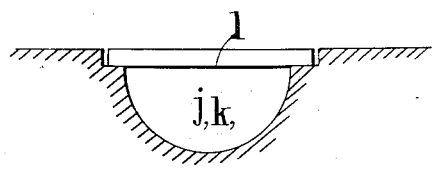
Figure 6:
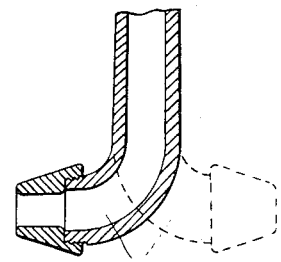

Referring now to the accompanying drawings which illustrate my invention, Figure 1 shows in perspective one form of tank for carrying out my improved process; Fig. 2 shows a sectional elevation of the tank shown in Fig. 1; Fig. 3 shows a plan of the bottom of the tank shown in Figs. 1 and 2, while Figs. 4 and 5 are enlarged detail views of the channels shown in Fig. 3. Fig. 6 is a detail.

In carrying the invention into effect according to one form, the straw is first washed by a relatively slow current of water, the washing being continued for say from two to twelve hours according to the quality and conditions of the straw, then water containing a suitable bacterial food, say a watery suspension of flour is supplied, the bath allowed to stand from two to three hours, and retting continued in a slow current of warm water until completed. The adding of the food is delayed until after the washing has been effected so that this initial washing materially assists the process by carrying off the dirt and more soluble matters. This form of the process is carried out by arranging the straw in sheaves vertically in a suitable tank, *a*, provided with a series of removable longitudinal and transverse cross-bars, *b*. The cross-bars are arranged at such a height that a space is left between the top of the straw and the bars, so that when the liquid is introduced into the tank the sheaves rise or float until stopped by the bars, and thus leave a space between their bottom ends and the bottom of the tank when the latter is full of liquid. The liquid level of the tank is maintained at some distance above the top of the sheaves. The tank, *a*, may be say 18 feet long, 9 feet wide, and 5 feet deep, the arrangement of the cross-bars being such that when the tank is full of liquid a space of 8 inches or thereabout is left between the bottom of the sheaves and the bottom of the tank. The level of the liquid may be maintained at say 6 inches above the level of the upper surface of the sheaves.

It is important that the water should flow uniformly through the straw and for this purpose disturbance in the vessel is to be avoided, to this end it is caused to enter and be equally distributed throughout the top layer in the tank by nozzles, *c d e* and *f*, in the positions indicated. These nozzles are carried by arms which are rotatably mounted so that the nozzles may be positioned for discharging the water in either direction while the arms may preferably be arranged to be swung aside clear of the tank.

In the center of the tank a division piece, *m*, is disposed above the cross-bars, and is preferably detachably secured thereto. The length of the division piece in the present case is about 15 feet, so that a space of about 18 inches is left between the ends thereof and the sides of the tank. By setting the nozzles in the appropriate positions, the fluid issuing therefrom causes a circulation of the water in the top layers of the tank in a right or left hand direction accordingly, the rate of distribution being controlled either by varying the rate of discharge from the nozzles or by varying the operative number of the same. The division piece, *m*, prevents the formation of cross currents or eddies, and thus allows the incoming fluid to be uniformly distributed throughout the top layer of the tank.

To assist in causing the water to pass through the tank by a displacement method insuring as nearly as possible that the liquid passes through the tank in a vertical direction from top to bottom at a uniform rate over the area of the tank, I arrange the bottom of the tank as shown in Fig. 3, to give as nearly as possible a uniform rate of withdrawal over the area of the tank. In this arrangement two grids, *g* and *h*, are interconnected with one another the grid, *h* being also connected to the outlet *i*. From these grids, channels, *j* and *k*, radiate, the construction of the channels being shown in the detail views, Figs. 4 and 5. These channels are formed in the present case of semi-circular section, on the top of which a number of slates or tiles, *l*, are disposed which are arranged so that their upper surfaces are flush with the bottom of the tank. These tiles are separated from one another by spaces, *n*, so that the grids and spaces insure that the flow of water through the tank takes place in a vertical direction at a nearly uniform rate.

The rate of flow varies with the nature of the straw and in some cases in accordance with the progress of retting but for a vessel of the dimensions above indicated, a normal rate of flow would be about 300 gallons per hour, although in exceptional conditions it might be reduced even to stoppage or increased to say 800 gallons per hour.

It will be understood that the arrangement of channels may be modified from that above described, so long as they are arranged in such a manner as to provide a uniform flow of the liquid through the straw in a vertical direction.

When the washing is deemed sufficient, the tank is drained. At this stage a suitable food-stuff for the retting bacteria can be added to the ingoing water, and in this way the development of the retting bacteria is assisted. Or the food may be added to water in a separate tank and run into the retting tank till the latter is full as before, the filling being done rapidly from the bottom so as to secure uniform distribution throughout the straw. After about 2 hours' rest, the slow flow of water is started as before and continued till the retting is completed. The food-stuff should be uniformly mixed with the water and may consist of proteid of either animal or vegetable origin, which may be used either in admixture with other substances or purified e. g. casein or any other suitable nitrogen-containing food-stuff may be used. The retting is preferably carried out at a temperature of from 20° C. to 40° C. and at 30° C. will generally be found to have terminated in about four days including the initial washing. In some cases it may be desirable to decrease the rate of retting to improve the color and strength of the fiber e. g. by working at a lower temperature. After retting has been completed in this way the material is subjected to the usual subsequent drying, storage, etc.

In addition to the advantages already indicated, it is important to observe that by proceeding according to the present invention it is possible practically wholly to obviate loss of fiber and this is largely due to the uniformity of the retting which takes place, and the control under which the retting is effected.

It will be understood that the present invention may be carried into effect in many different ways, and that the specific form above described is referred to by way of example only.

Having now described my invention, what I claim as new and desire to secure by Letters Patent is:—

1. A process for retting fiber-yielding straws consisting in disposing said straws vertically in a compact mass in an appropriate container, filling the said container with water and continuously replacing said water by slow withdrawal at the base and co-incident introduction without disturbance of the same amount of fresh water at the top of the container; as set forth.

2. A process of retting flax straw consisting in disposing said straw vertically in a compact mass in an appropriate container, causing a slow current of warmed water to pass through said container and constraining said current to traverse the mass uniformly in a vertical direction from the top to the bottom; as set forth.

3. A process of retting flax straw consisting in disposing said straws vertically in a compact mass on and at some distance from the bottom of an appropriate container, filling said container with warmed water to some distance above the level of said straws and continuously displacing the water from between the straws by slow withdrawal of the water at the base of the vessel and replacement by a fresh quantity introduced at the top and constrained uniformly to enter and pass through the straw mass in a vertical direction; as set forth.

4. A process for retting flax straw including disposing said straws vertically and in a compact mass in an appropriate container causing a current of warm water to flow into said container as a gentle current circulating with only horizontal velocity over said straws and withdrawing the water at the same rate as of introduction from the base of the mass and at a large number of points uniformly distributed over the same; as set forth.

5. A process for retting flax straw including disposing the straw vertically in a uniformly vertically flowing slow current of water interrupting said flow, draining said straw, steeping it in still water containing a food stuff, and again subjecting it to said current of flowing water; as set forth.

In testimony whereof I have signed my name to this specification in the presence of two subscribing witnesses.

WILLIAM JAMES FERNIE.

Witnesses:
M. ATKINSON ADAM,
BERTRAM H. MATTHEWS.